UNITED STATES PATENT OFFICE.

CLAYTON W. BEDFORD, OF AKRON, OHIO, ASSIGNOR TO THE GOODYEAR TIRE & RUBBER COMPANY, OF AKRON, OHIO, A CORPORATION OF OHIO.

ART OF VULCANIZING CAOUTCHOUC.

1,371,663.     Specification of Letters Patent.     Patented Mar. 15, 1921.

No Drawing.     Application filed March 19, 1919. Serial No. 283,634.

*To all whom it may concern:*

Be it known that I, CLAYTON W. BEDFORD, a citizen of the United States, residing at 1144 East Market street, Akron, Ohio, in the county of Summit and State of Ohio, have invented a new and useful Improvement in the Art of Vulcanizing Caoutchouc, of which the following is a specification.

This invention relates to the art of vulcanizing or curing caoutchouc substances and to the products resulting therefrom, and is fully set forth in the following specification.

From the present knowledge of the art of curing rubber, synthetic or natural, it appears that the presence of nitrogen-containing bodies during vulcanization is essential to the formation of a practical or commercial product. Nitrogen-containing bodies may be found in natural rubber, as obtained from latex, or may be added during the process of manufacture. The absence of all nitrogen, however, results in a vulcanization product that is of no value commercially. It has hence been the practice to add to the rubber, before vulcanization, certain nitrogen bodies which improve the properties of the product and shorten the time required to cure it.

These nitrogen bodies have been known to the trade by the name of "accelerators." A large number of publications may be found disclosing the utility and properties of certain specific nitrogen bodies and of certain classes or types of nitrogen bodies as accelerators, these types or classes having been classified according to their chemical constitution and reactions or by certain physical properties such as dissociation constants, etc. All of these bodies will be hereinafter included in the general term, "nitrogen accelerators."

I have found that the nitrogen accelerators now known to the art are not usually the ultimate bodies which assist in the vulcanization of caoutchouc, but that these nitrogen accelerators must first react with sulfur and that the sulfur reaction product thus formed is the agent which either aids or is entirely responsible for the satisfactory vulcanization of the rubber with sulfur.

Furthermore, in the procedure heretofore utilized there are certain marked disadvantages. For example, the temperatures used in vulcanizing caoutchouc are only occasionally and by mere coincidence, the temperatures most suitable for a reaction between sulfur and a nitrogen accelerator. Thus it is frequently the case that the proper temperature for vulcanization is not sufficiently high to bring about satisfactorily a reaction between the nitrogen accelerator and the sulfur, which results in that a substance which is in reality a good accelerator appears to be wholly inactive, or does not exert its full curing power. For example, carbanilid is almost inactive at the usual vulcanization temperature corresponding to 40 pounds of steam pressure, whereas at 60 to 80 pounds pressure it shows very valuable qualities.

In many cases valuable nitrogen accelerators are regarded as commercially impractical by reason of the fact that large volumes of gas are produced during their reaction in the vulcanization process, the resulting product being correspondingly porous and defective. Since the gases produced during this reaction frequently contain $H_2S$ and other malodorous compounds, the product obtained is frequently very foul smelling. This is the case for example, with such compounds as hexamethylenetetramin and urea, in the use of both of which large volumes of gas are liberated during the vulcanization process as a result of the reaction of these bodies with sulfur.

In the process of the present invention, the disadvantages above described have been avoided, the use of nitrogen accelerators in vulcanization facilitated and the results of their use greatly improved by first causing a reaction of the nitrogen accelerator with sulfur in suitable proportions prior to incorporation into the mix to be vulcanized. It is then possible to carry out the reaction between the nitrogen accelerator and the sulfur at the temperature best suited thereto, and to remove any undesired gaseous or other by-products which are formed as a result of the reaction with the nitrogen accelerator. It is therefore possible, by the present process, to employ many nitrogen accelerators which at present are regarded as impractical or of no commercial value and to secure more advantageous results with many accelerators now in use.

The first stage of my process, wherein the nitrogen accelerator is acted upon by sulfur prior to introduction into the other mix, may result in a substitution of sulfur in the nitrogen accelerator, indicated by the liberation of hydrogen sulfid and other volatile sulfur compounds, although sulfur addition and polymerization may, and probably do, occur.

The proportions of a sulfur reaction product of a nitrogen accelerator, which will hereinafter be designated as a sulfur-nitrogen accelerator, which are incorporated into the rubber mix, may be varied. Thus, in a mixture containing one part of sulfur, sixteen parts of zinc oxid and sixteen parts of pale-crape plantation rubber, from one-half part to two parts of the sulfur nitrogen accelerator may be used. Such a mixture may be vulcanized by heating under from forty to fifty pounds of steam pressure for from twenty to fifty minutes, the time required for curing the rubber being greatly diminished by the addition of a sulfur nitrogen accelerator. The resulting vulcanized product is of higher quality than a like mix, which is vulcanized without the accelerator, as evidenced by its higher tensile strength, higher modulus of elasticity, etc. Furthermore, by shortening the time of cure, the output of a given equipment is increased.

In the present embodiment of my invention, the nitrogenous compounds utilized are preferably nitroso derivatives of anilins, for example, paranitroso-dimethylanilin. The reaction may be effected by the direct action of sulfur upon the nitrogenous compounds, or the reaction may take place in the presence of a solvent diluent, preferably an aromatic amin, such as anilin.

As an example of the first type of reaction, 150 parts of paranitrosodimethylanilin and 64 parts of sulfur may be mixed together and the mixture placed in small increments in a flask under a reflux condenser, heat being applied after each addition until the violent reaction has taken place. After completion of the reaction upon all of the mixture, the entire reaction product is removed and homogeneously mixed together, being then ready for use in compounding with a rubber mix. The product of the reaction is a reddish brown mass of soft resinous consistency, and may be utilized as exemplified in the example above recited.

In the presence of an aromatic amin, such as anilin, the reaction may be carried out as follows, using 150 parts paranitrosodimethylanilin,
64 parts sulfur,
465 parts anilin.

The nitroso compound is dissolved in the anilin and heated to about 120°. The sulfur is then added in small portions until the reaction is completed. After boiling under a reflux condenser for a few minutes, heating is stopped and the free anilin is distilled off by means of steam. By the use of a relatively large amount of anilin (5 molecular parts) as above indicated, a violent reaction is avoided. It is furthermore possible, and is indicated by the weight of the reaction products, that the anilin enters into the reaction, apparently to the extent of 2 mols. of anilin to 1 mol. of the nitroso compound. The product is ready for use after steam distillation to remove free anilin and drying, and is a hard, dark brown, brittle and readily frangible solid, and may likewise be utilized as above recited.

It is readily apparent that in the examples given, other nitroso derivatives of alkyl-substituted anilin and homologues of paranitrosodimethylanilin may be used and furthermore, that the anilin may be replaced by other aromatic amins, such as para-toluidin. It is also to be noted that, although in the examples cited, I have selected relative proportions of the nitrogenous compounds and the sulfur in such manner as to cause the sulfur to react completely with the nitrogenous compounds, I may utilize in addition the entire amount of sulfur required for the vulcanization process in carrying out the reaction between it and the nitrogenous compounds, prior to the admixture with the rubber mix.

In my prior application, Serial No. 140,888, whereof this application is a continuation, I have set forth certain broad aspects of the process involved in the present application and although I have in that and in the present application set forth certain theories as to the processes involved, I do not intend that my invention shall be limited by the accuracy of such theories, nor by the details of process steps specifically disclosed by way of illustration of my invention, except in so far as such limitations are contained in the accompanying claims.

What I claim is new and desire to secure by Letters Patent, is—

1. The process of effecting the curing of rubber which consists in bringing together under reacting conditions sulfur and a nitroso derivative of an aromatic amin to form a sulfur-nitrogen accelerator, incorporating the sulfur-nitrogen accelerator in the caoutchouc mix and vulcanizing the same.

2. The process of effecting the curing of rubber which consists in bringing together under reacting conditions sulfur and a nitroso derivative of an alkyl substituted aromatic amin to form a sulfur-nitrogen accelerator, incorporating the sulfur-nitrogen accelerator in the caoutchouc mix and vulcanizing the same.

3. The process of effecting the curing of rubber which consists in bringing together under reacting conditions sulfur and paranitrosodimethylanilin to form a sulfur-nitrogen accelerator, incorporating the sulfur-nitrogen accelerator in the caoutchouc mix and vulcanizing the same.

4. The process of effecting the curing of rubber which consists in bringing together under reacting conditions sulfur and a nitroso derivative of an aromatic amin in the presence of an aromatic amin to form a sulfur-nitrogen accelerator, incorporating the sulfur-nitrogen accelerator in the caoutchouc mix and vulcanizing the same.

5. The process of effecting the curing of rubber which consists in bringing together under reacting conditions sulfur and paranitrosodimethylanilin in the presence of anilin to form a sulfur-nitrogen accelerator, incorporating the sulfur-nitrogen accelerator in the caoutchouc mix and vulcanizing the same.

6. The vulcanized product formed by the reaction of caoutchouc, a vulcanizing agent and the product of reaction of sulfur on paranitrosodimethylanilin.

7. The process of curing rubber which consists in incorporating into a caoutchouc mix a sulfur nitrogen compound produced by reaction of sulfur with a paranitroso derivative of an aromatic amin and heating the resulting mixture with a vulcanizing agent.

8. The process of curing rubber which consists in incorporating into a caoutchouc mix a sulfur-nitrogen compound produced by reaction of sulfur with paranitrosodimethlanilin and heating the resulting mixture with a vulcanizing agent.

9. The process of curing a rubber which consists in incorporating into a caoutchouc mix a sulfur-nitrogen compound produced by reaction of sulfur with paranitrosodimethylanilin in the presence of anilin and heating the resulting mixture with a vulcanizing agent.

10. The process of curing rubber which consists in incorporating into a rubber mix a sulfur-nitrogen compound produced by reaction of sulfur with a nitroso derivative of an aromatic amin, and heating the resulting mixture with a vulcanizing agent.

11. The process of curing rubber which consists in incorporating into a rubber mix a sulfur-nitrogen compound produced by reaction of sulfur with a nitroso derivative of an alkyl-substituted aromatic amin and heating the resulting mixture with a vulcanizing agent.

12. The process of curing rubber which consists in incorporating into a rubber mix a sulfur-nitrogen compound produced by reaction of sulfur with a nitroso derivative of an aromatic amin in the presence of an aromatic amin, and heating the resulting mixture with a vulcanizing agent.

In witness whereof, I have hereunto signed my name in the presence of two subscribing witnesses.

CLAYTON W. BEDFORD.

Witnesses:
L. M. HARTMAN,
E. C. LEADENHAM.